Sept. 18, 1956  G. R. DUNCAN  2,763,240
MEANS FOR MILKING AND HANDLING THE MILK OF FARM ANIMALS
Filed Oct. 16, 1953  3 Sheets-Sheet 1

INVENTOR
GEORGE R. DUNCAN

BY Mason, Mason & Sheridan
ATTORNEYS

INVENTOR
GEORGE R. DUNCAN
BY *Mason, Mason & Sheridan*
ATTORNEYS

United States Patent Office 2,763,240
Patented Sept. 18, 1956

2,763,240

MEANS FOR MILKING AND HANDLING THE MILK OF FARM ANIMALS

George R. Duncan, Washington, Mo., assignor to Zero Manufacturing Company, Washington, Mo., a company of Missouri Application October 16, 1953, Serial No. 386,458

7 Claims. (Cl. 119—14.09)

The present invention relates to a means for simultaneously milking a plurality of cows into a refrigerated transport tank. The tank may be a trailer tank or a truck with means for pulling the same into a milk house or milking quarters, and attachments whereby the milk is received direct from one or more cows into the refrigerated tank.

An object of the invention is to provide a milking system of the type above described in order to facilitate the handling of milk in an expeditious and sanitary manner.

A further object is to provide milking equipment that requires no lifting of milk cans or other heavy physical labor by the operator.

An additional object is to provide a construction for simultaneously milking a plurality of cows whose milk is caused to flow directly into a refrigerated tank.

Yet another object is to provide means for conveying milk from a plurality of cows into a single portable refrigerated receptacle.

Other objects will appear hereinafter throughout the specification.

In the drawings:

Figure 3b is an enlarged vertical section of certain parts of the structure shown in Figure 3a;

Figure 3c is a side elevation of a cap to be used in place of the parts shown in Figure 3b.

The present invention is particularly directed to an apparatus for facilitating the milking of a plurality of cows. The milk from these cows is untouched by human hands. This apparatus speeds up the milking process which latter has been a handicap to farmers and others who operate dairy farms. The apparatus further greatly reduces the use of manual labor during the milking operation.

Figure 1:
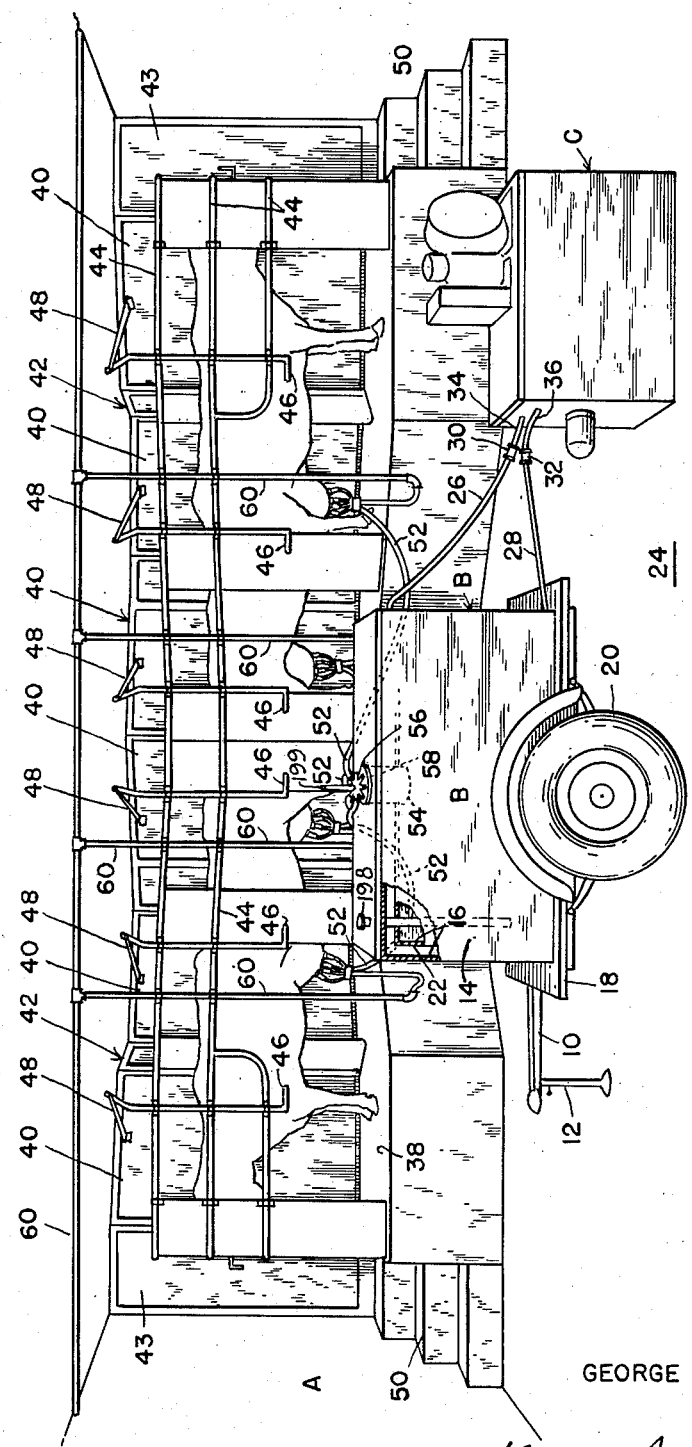
Figure 1 is a side elevational view of a preferred form of the invention taken from one side of the milking quarters and showing the portable milking receptacle.
Figure 2:
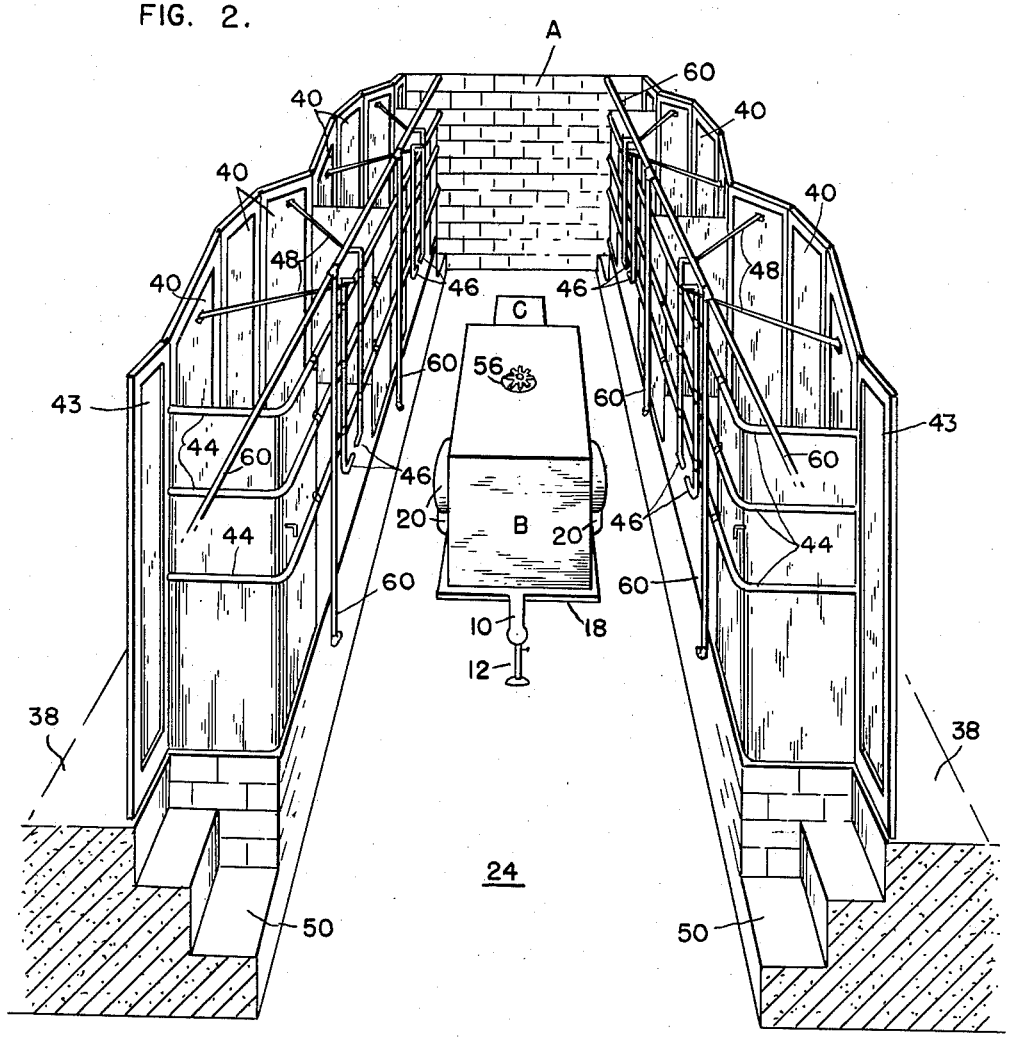
Figure 2 is a perspective view of the milking quarters and the portable receptacle without the hose line and teat cups shown in Figure 1, but modified to milk two cows on each side.

Referring to Figures 1 and 2 of the drawings, the letter A designates a milk house or milking quarters and B, a conveyance such as a farm trailer for the milk tank, and C indicates the means for maintaining the contents of the tank under refrigeration.

The construction shown in Figures 1 and 2 permits the simultaneous milking of eight cows into a tank.

Referring to the conveyance or farm trailer or wheel supported chassis B and the refrigerating means C, the former is provided with a draw bar 10 supported by a jack 12. The refrigerator 14 is provided with the usual double walls 16 and is supported on a platform 18 having a pair of wheels 20.

The cooling plant or refrigeration producing means C is preferably mounted on the floor 24 in fixed position. The cooling means as shown in Figure 1 is separately supported from the milk tank, which latter is supported on the wheels 20. The inlet and outlet hose lines 26 and 28, respectively, are attached by conventional coupling members 30 and 32 to the inlet and outlet hose lines 34 and 36, respectively, of the unit C. Refrigerated water is conveyed via the lines 26, 34 to be so connected as to fill the space between the double walls 16. After heat exchange takes place between this water and the tank 22, the water is returned via hose lines 36, 28 to unit C where it is again cooled and returned to the top of the tank 22. The milk hose or milking quarters A include the elevated platform 38, a plurality of doors 40 leading to the barn, not shown. These partitions 42 and additional doors 43 form a solid wall between the milk hose or milking quarters and the barn. Ramps, not shown, lead from the doors to the barn whereby the animals may be led from the barn to the stalls formed by the doors and partitions on one side and by the piping 44. The doors 40 are operated by handles 46 which operate crank members 48 attached to the doors. The platforms 38, as seen in Figure 2, are connected to the floor 24 by steps 50. With the construction shown, the cows are arranged on each side in a plurality of pairs, one pair facing in the opposite direction from the other pair. Each pair of animals which face in the same direction are in echelon so as to provide a minimum distance of movement by the operator in attaching the sets of teat cups to the animals' udders. With this construction, it is possible to materially shorten the hose lines 52 from the teat cups which lead to the interior of the tank 22.

The refrigerator 14 is provided with an opening 54 in the top thereof which may be closed by the pivoted top 56. This opening preferably lies directly above the opening 58 shown in dotted lines in Figure 1. Milk hose lines 52 and vacuum lines 60 are connected to the teat cups as shown. The vacuum line leads to and is connected with any suitable milking machine, such as the pulsator type milker.

Figure 3:
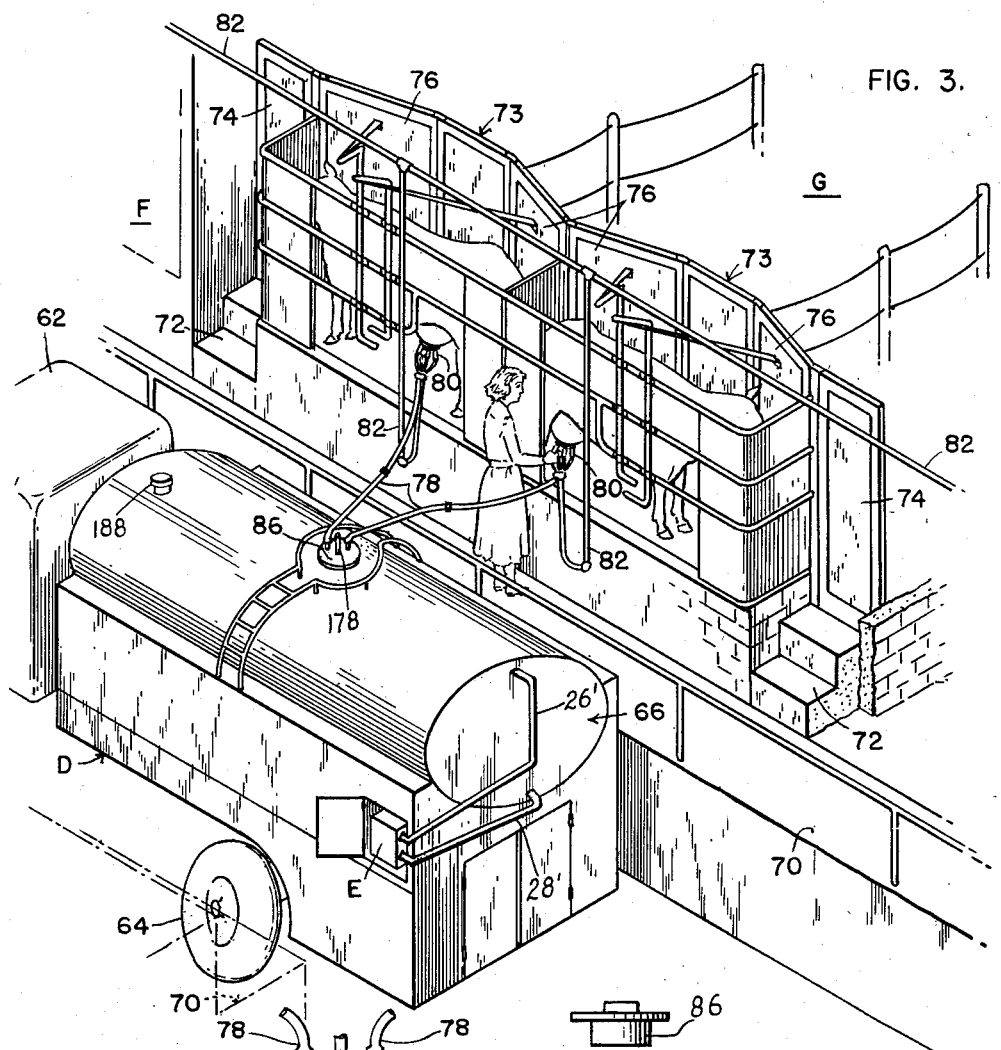
Figure 3 is a perspective view of a second form of the invention showing one side of the milking quarters and showing the portable milking receptacle.
Figure 3A:
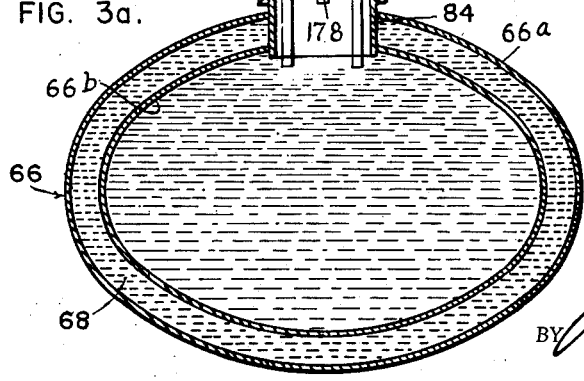
Figure 3a is a vertical section of the tank shown in Figure 3.

In Figures 3 and 3a, a different construction is shown where D is a truck including a chassis and E is a means for maintaining the contents of a milk tank under refrigeration. The truck is provided with the usual cab 62 and the usual chassis as shown in Figure 3 supported by wheels 64, only one of which is shown. Supported on the truck is a double-walled tank 66 including an outer wall 66a and an inner wall 66b. The space 68 between the walls, as shown in Figure 3a, may be filled with water from lines, 26' and 28', shown in dotted lines in Figure 3, leading from the refrigeration unit E, so that there is a continuous flow of cool water from the unit E to and from the interior 68 of the tank 66. In Figure 3, only one side of the milking house F is shown, but it will be understood that the side not shown would correspond to that shown in Figure 3. The milking parlor is provided with paltforms 70, step 72, and a wall 73 composed of doors 74 and 76, the former being used by the operator and the other being used by the animals to be milked. Doors 76 may be operated in a manner similar to the operation of doors 48 shown in Figure 1. Both sets of doors lead to the barn or other enclosure G.

Milk lines 78 are connected to teat cups 80 which latter are connected by vacuum lines 82 to a pulsating mechanism, not shown. The pulsating mechanism, not shown, may be connected to the vacuum line 200 and 202, as in my Patent No. 2,702,019.

The top of the tank 66 is provided with an opening 84 that may be closed by a pivoted top 86. This opening extends through the double-walled tank 66 as shown in Figure 3a. With the construction shown in the several figures, it is possible for the milk producer to haul the milk to market, or to a bottling plant in the same stainless steel tank that he uses in his milk house. The stainless steel tank and the compressor or refrigerating unit have been shown as separate units in Figures 1 and 2, but they may be incorporated as a single unit as shown in Figure 3.

The letter E indicates diagrammatically the refrigerating unit. This unit not only includes the ordinary motor and driven compressor-condenser shown in my several patents, but a circulating system for causing the flow of fluid such as water from the cooling means to the space between the walls of the outer casing and the inner casing, as shown in Figure 3a, or between the outer and inner casing of the showing of Figure 1. The water is chilled by the refrigerating means and is caused to flow in the space between the outer and inner casings and then back again to the refrigerating means where it is again cooled and recirculated in the space between these walls.

Referring to Figures 1 and 2, the refrigerator 14 with its tank is placed on the trailer or truck B, and is backed or pulled into the milk house and connected to the unit C by means of the coupling members 34 and 36 as shown in Figure 1. With this construction, the refrigeration unit C does not have to be hauled with the full milk tank, following the milking operation.

As shown in Figures 1 and 3 the numerals 198 and 188 respectively indicate the tank drain means, the same as shown in my Patent No. 2,702,019 of February 15, 1955, and number 199 indicates the vacuum line.

The combined refrigerator 14 and tank 22 stores and refrigerates the milk which enters the tank direct from the cow, thereby obviating the use of cans, buckets, milking utensils or vacuum releasers. The milk is not exposed to air or is it touched by human hands. Moreover, there is no carrying or pulling of the milk from one container to another as in prior constructions.

The tank shown in Figures 3 and 3a is for use where the bottling plant sends its trucks to the various dairy farms. In using this construction, the same benefits enumerated above are obtained.

Figures 3B, 3C:
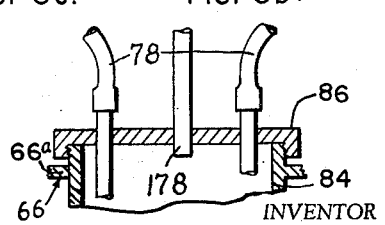

As shown in Figures 3a and 3b, the cover 86 seals the top of the opening 84. The construction, however, may be the same as that shown in my Patents 2,498,401, granted February 21, 1950, or Reissue Patent 23,544, granted September 2, 1952, or as disclosed in my Patents No. 2,740,378 of April 3, 1956, and No. 2,702,019 of February 15, 1955. The tank is provided with milk line 78 and a vacuum line 178, such as disclosed in my Patent No. 2,702,019.

The words "substantially cylindrical" in the claims as it pertains to both the milk cooler and the milk receptacle includes other round sided coolers and milk receptacles, such as oval shaped, elliptical and other shaped sides, in order to distinguish from a cooler and bulk milk receptacle having flat sides, as shown in my Patent No. 2,740,378.

It will be understood that any drain means may be provided for draining the milk from the milk receptacle either by suction, such as shown in my Patent No. 2,702,019, or in any other suitable manner.

The constructions disclosed herein greatly add to the convenience and effect many economies to the dairy farmer, and enable him to simultaneously milk a plurality of cows into a single refrigerated receptacle to thereby effect a degree of sanitation not heretofore known.

The above description and drawings disclose several embodiments of the invention, as specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A system for milking a farm animal and delivering the milk as it comes from the animal into a cooled bulk receptacle comprising a milking means, a milk cooling means comprising an outer fluid tight wall and a single milk receptacle forming an inner wall and permanently fixed within said outer wall, occupying a substantial part of the interior space thereof and providing a cooling liquid receiving space between the same and said outer wall, said milk receptacle being of substantially cylindrical form, a milk line interconnecting said milking means and said milk receptacle, vacuum means operatively associated with said receptacle, and refrigerating means including fluid circulating conduit means operatively connected through said outer wall to said space for continuously circulating cooling liquid therein during the milking operation.

2. The structure set forth in claim 1, wherein said milk cooling means, including the inner and outer walls thereof, are provided with wheel supporting means.

3. The structure of claim 1, wherein said milk cooling means, including said inner and outer walls, are provided with wheel supporting means, and said refrigerating means being separately supported from said cooling means.

4. A system for milking a farm animal and delivering milk as it comes from the animal into a cooled bulk receptacle comprising a milking means, a milk cooling means comprising an outer fluid tight wall and a single milk receptacle forming an inner wall and permanently fixed within said outer wall, occupying a substantial part of the interior space thereof and providing a cooling liquid receiving space between the same and said outer wall, said milk receptacle being of substantially cylindrical form, a milk line interconnecting said milking means and said milk receptacle, vacuum means operatively associated with said receptacle, and refrigerating means including fluid circulating conduit means operatively connected through said outer wall to said space for continuously circulating cooling liquid therein during the milking operation, wherein said milk cooling means including said inner and outer walls are provided with wheel supporting means, and separate supporting means for said refrigerating means and said fluid conduit means including a plurality of coupling members whereby to disconnect said refrigerating means from said milk cooling means.

5. The structure of claim 1 in which the said inner and outer walls of said milk cooling means comprises a tank and a wheel supported chassis for supporting said tank.

6. A system for milking a farm animal and delivering the milk as it comes from the animal into a cooled bulk receptacle comprising a milking means, a milk cooling means comprising an outer fluid tight wall and a single milk receptacle forming an inner wall and permanently fixed within said outer wall, occupying a substantial part of the interior space thereof and providing a cooling liquid receiving space between the same and said outer wall, said milk receptacle being of substantially cylindrical form, a milk line interconnecting said milking means and said milk receptacle, vacuum means operatively associated with said receptacle, and refrigerating means including fluid circulating conduit means operatively connected through said outer wall to said space for continuously circulating cooling liquid therein during the milking operation, said inner and outer walls of said milk cooling means comprising an elongated tank and a wheel supported chassis for supporting said tank, said refrigerating means being independently supported.

7. The structure of claim 6 including coupling members in said conduit means whereby said refrigerating means may be disconnected from said milk cooling means.

References Cited in the file of this patent

UNITED STATES PATENTS

| | | |
|---|---|---|
| 1,925,877 | Mitchum | Sept. 5, 1933 |
| 1,929,709 | Neely | Oct. 10, 1933 |
| 1,987,917 | Thwaits | Jan. 15, 1935 |
| 2,470,979 | Duncan | May 24, 1949 |
| 2,509,214 | Cordis | May 30, 1950 |
| 2,557,252 | Bannister et al. | June 19, 1951 |
| 2,608,951 | Kingston | Sept. 2, 1952 |
| 2,616,809 | Graves | Nov. 4, 1952 |
| 2,631,566 | Roop | Mar. 17, 1953 |

FOREIGN PATENTS

| | | |
|---|---|---|
| 14,887 | Great Britain | Dec. 10, 1908 |
| 304,361 | Great Britain | Jan. 21, 1929 |

OTHER REFERENCES

"Chore Boy," Chore-Boy Milking Machine Co., Lansing, Mich., April 1952.